United States Patent
Isgar

(10) Patent No.: US 12,007,245 B2
(45) Date of Patent: *Jun. 11, 2024

(54) COMPUTER CONTROLLED TRAVEL-BASED GEO-PAIRED INFORMATION SYSTEM WITH AI INTEGRATION

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/449,347

(22) Filed: Aug. 14, 2023

(65) Prior Publication Data

US 2023/0392947 A1   Dec. 7, 2023

Related U.S. Application Data

(63) Continuation of application No. 17/555,672, filed on Dec. 20, 2021, now Pat. No. 11,725,961, which is a
(Continued)

(51) Int. Cl.
*G01C 21/36* (2006.01)
*G01C 21/34* (2006.01)
(Continued)

(52) U.S. Cl.
CPC ..... *G01C 21/3682* (2013.01); *G01C 21/3476* (2013.01); *G01C 21/3644* (2013.01);
(Continued)

(58) Field of Classification Search
CPC ............ G01C 21/3682; G01C 21/3476; G01C 21/3644; G06F 16/29; G06F 16/487; H04W 4/021; H04W 4/185

See application file for complete search history.

(56) References Cited

U.S. PATENT DOCUMENTS 8,135,624 B1   3/2012   Ramalingam et al.
9,401,771 B2   7/2016   Macleod et al.
(Continued)

OTHER PUBLICATIONS

Isgar, Charles, Travel-Based Geo-Paired Information System, Patent Cooperation Treaty Application Serial No. PCT/US2020/063594, filed Dec. 7, 2020, International Search Report and Written Opinion dated Jan. 21, 2021.

*Primary Examiner* — Joseph E Dean, Jr.
(74) *Attorney, Agent, or Firm* — Schmeiser, Olsen & Watts LLP

(57) ABSTRACT

Described is a travel-based geo-paired information system. The system includes a server having a memory storing geo-paired information that includes content regarding or related to a point of interest. The system also includes a user computing device coupled to the server. The server may be programmed to receive location information from the user computing device. The server may also be programmed to automatically process the location information and determine whether a location of the user computing device is within a predetermined distance from a point of interest geolocation. Then the server may automatically find and retrieve geo-paired information corresponding to or paired to the point of interest geolocation and automatically deliver to the user computing device, for presenting, the content related to the point of interest corresponding to the location of the user computing device.

5 Claims, 11 Drawing Sheets

Related U.S. Application Data continuation of application No. 16/706,698, filed on Dec. 7, 2019, now Pat. No. 11,204,255.

(60) Provisional application No. 62/776,514, filed on Dec. 7, 2018.

(51) Int. Cl.
  *G06F 16/29* (2019.01)
  *G06F 16/487* (2019.01)
  *H04W 4/021* (2018.01)
  *H04W 4/18* (2009.01)

(52) U.S. Cl.
  CPC ............ *G06F 16/29* (2019.01); *G06F 16/487* (2019.01); *H04W 4/021* (2013.01); *H04W 4/185* (2013.01)

(56) References Cited

U.S. PATENT DOCUMENTS

| | | |
|---|---|---|
| 9,841,814 B1 | 12/2017 | Kallmeyer et al. |
| 11,725,961 B2 * | 8/2023 | Isgar .................. H04W 4/021 455/456.3 |
| 2010/0306211 A1 | 12/2010 | Chaudhuri et al. |
| 2014/0248911 A1 | 9/2014 | Rouda, Jr. |
| 2015/0052131 A1 | 2/2015 | Suzuki |
| 2015/0289093 A1 | 10/2015 | Petty et al. |
| 2018/0112996 A1 | 4/2018 | Montell |

* cited by examiner

COMPUTER CONTROLLED TRAVEL-BASED GEO-PAIRED INFORMATION SYSTEM WITH AI INTEGRATION

CROSS REFERENCE TO RELATED APPLICATION[S]

This application is a continuation of U.S. patent application Ser. No. 17/555,672, filed Dec. 20, 2021, which is a continuation of U.S. patent application Ser. No. 16/706,698, filed Dec. 7, 2019, now U.S. Pat. No. 11,204,255, issued on Dec. 21, 2021, which claims priority to U.S. Provisional Patent Application Ser. No. 62/776,514, filed Dec. 7, 2018, the disclosure of which is hereby incorporated entirely herein by reference.

BACKGROUND OF THE INVENTION

Technical Field

This invention generally relates to information systems providing content to travelers in vehicles, and specifically to a travel-based geo-paired information system for providing content related to points of interest to travelers based on the real time geolocation of the traveler.

State of the Art

Individuals who travel an extended distance often do so in cars, trains, planes or the like. Generally, long-distance travel includes travel through various parts of a state, region or country. Many travelers utilize music, audio books, movies or other forms of entertainment during a long trip over an extended distance. These forms of entertainment are typically stored or otherwise provided on a mobile computing device, a radio, a vehicle audio/video system and the like. However, this entertainment does not correlate to the route travelled. The route travelled by a traveler often includes passage by a historical site, a particular region and monument or other geographical, historical, important and/or interesting location. These locations typically have a story or information that is interesting. There is a lack of systems or devices that can allow a traveler to obtain information about these historical sites, particular regions and monuments or other geographical, historical, important and/or interesting locations.

Accordingly, what is needed is an audio and/or video entertainment system for travelers based on the real-time geolocation of the traveler.

SUMMARY OF THE INVENTION

An embodiment includes a travel-based geo-paired information system comprising: a server having a memory storing geo-paired information; and a user computing device coupled to the server, wherein the server is programmed to: receive location information from the user computing device; automatically process the location information and determine whether a location of the user computing device is within a predetermined distance from a point of interest geolocation; automatically find and retrieve geo-paired information corresponding to the point of interest geolocation; and automatically deliver to the user computing device for presenting the geo-paired information corresponding to the location of the user computing device.

Another embodiment includes a travel-based geo-paired information system comprising: a server having a memory storing geo-paired information; and a user computing device coupled to the server, wherein the server is programmed to: receive a travel route from the user computing device and identify at least one point of interest geolocation along the travel route; automatically find and retrieve geo-paired information corresponding to the at least one point of interest geolocation; automatically deliver for download to the user computing device for presenting the geo-paired information corresponding to the at least one point of interest geolocation; receive location information from the user computing device; automatically process the location information and determine whether a location of the user computing device is within a predetermined distance from a point of interest geolocation; and send instruction to the user computing device to present the geo-paired information in response to determining the location of the user computing device is within the predetermined distance from the at least one point of interest geolocation.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a travel-based geo-paired information system wherein geo-paired information or content corresponds to a geolocation of the traveler and the user computing device used by and located with the traveler.

Figure 1:
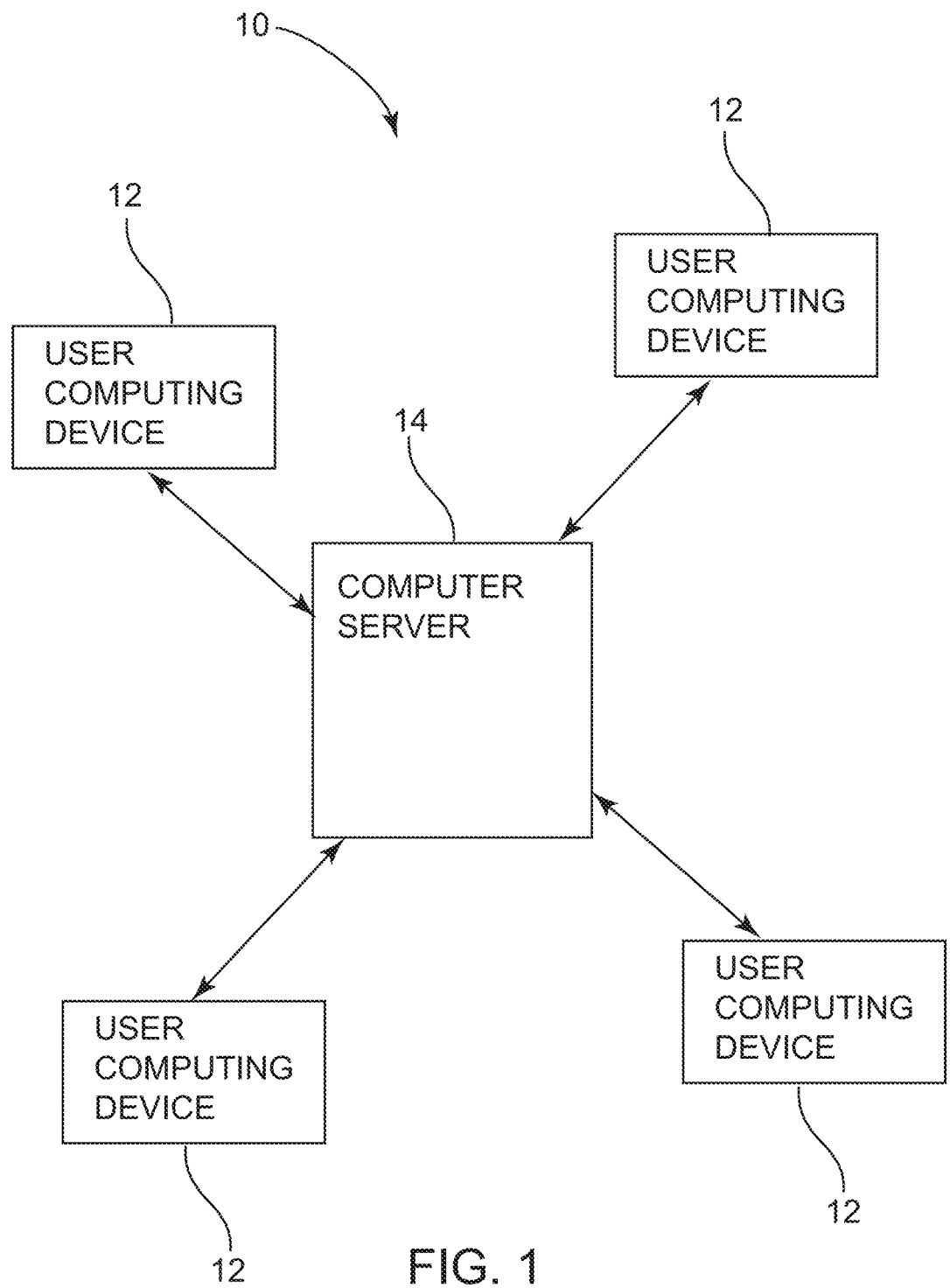
FIG. 1 a diagrammatic view of a travel-based geo-paired information system according to an embodiment.
Figure 2:
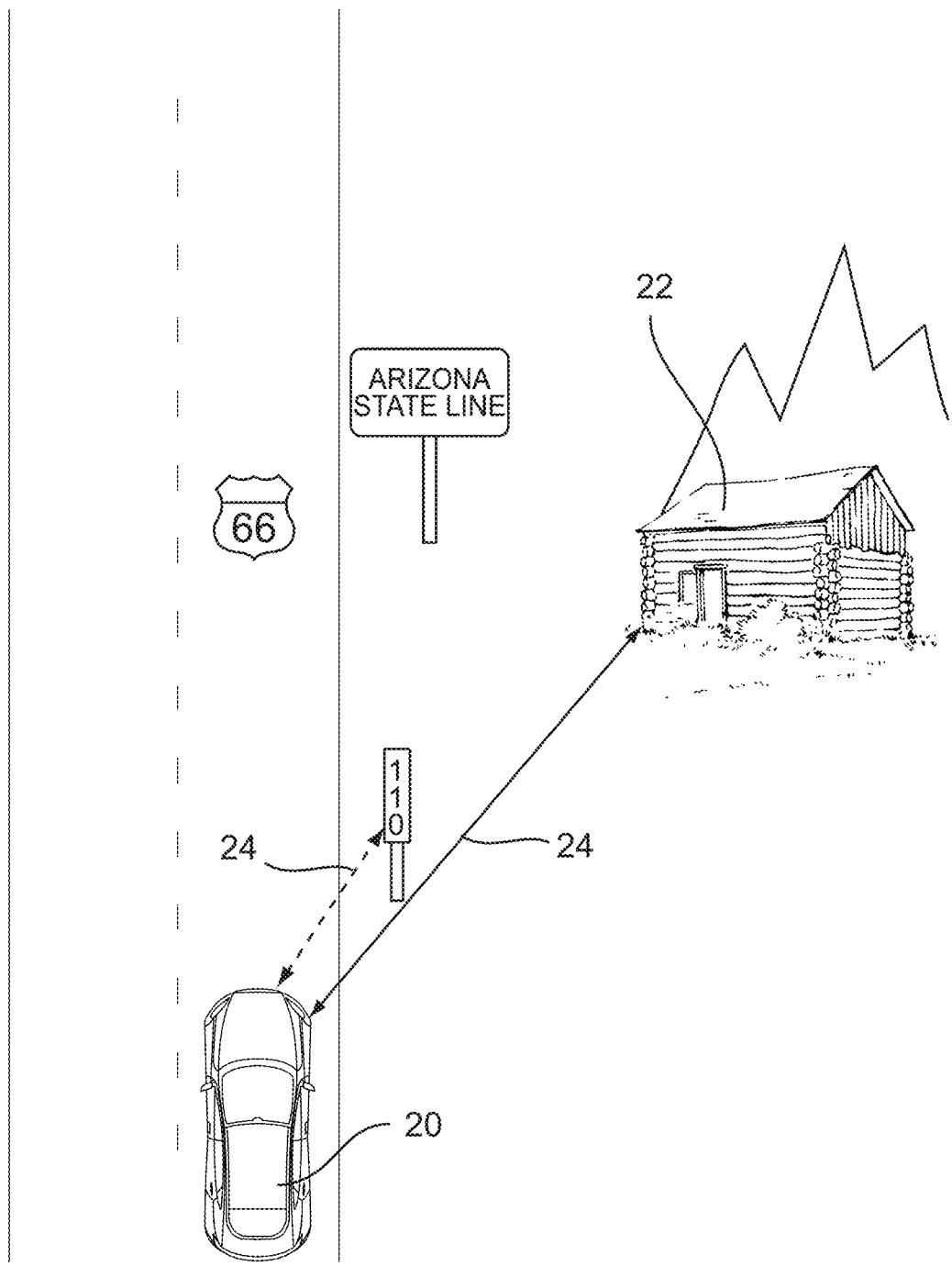
FIG. 2 depicts a travel-based geo-paired information system used in a vehicle that is a predetermined distance from a point of interest geolocation according to an embodiment.
Figure 3:
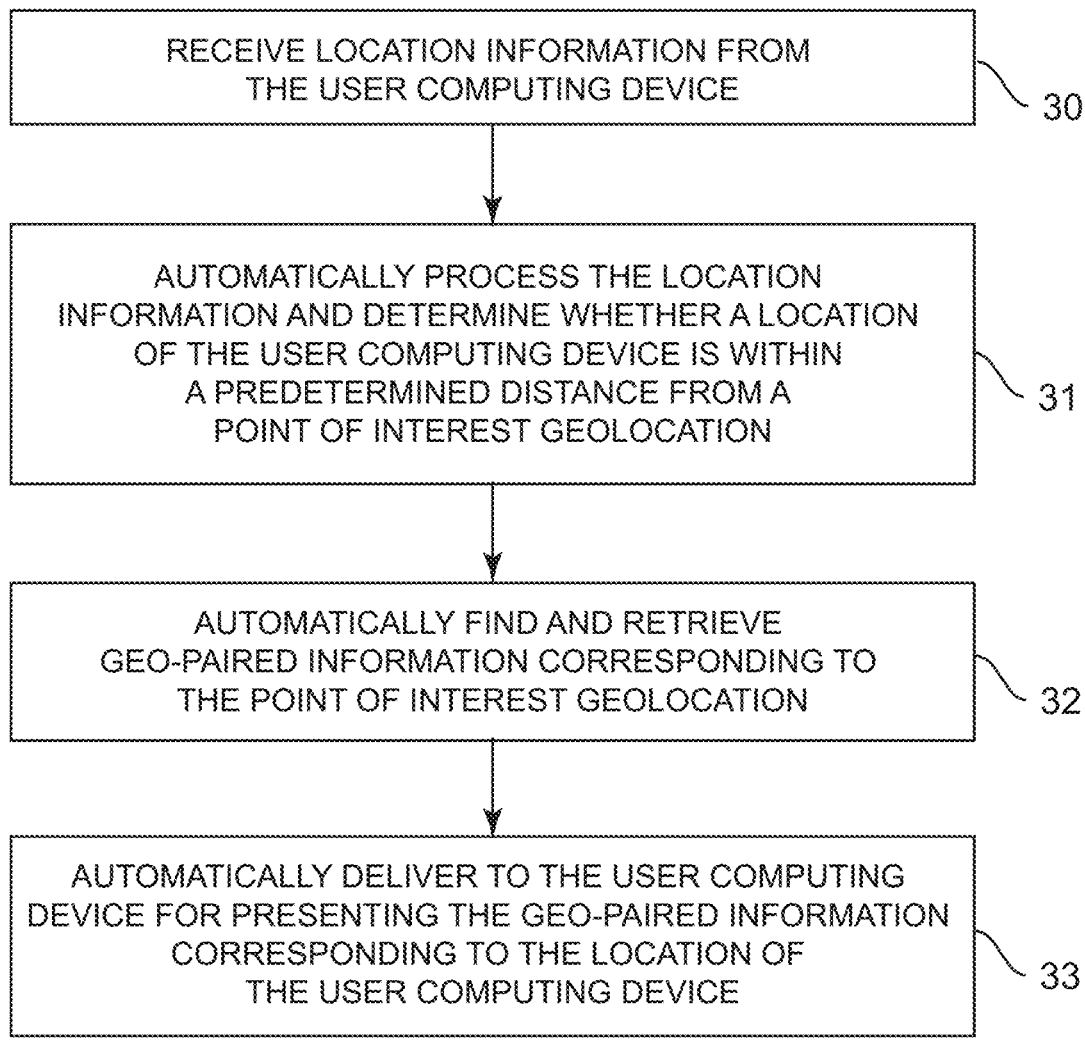
FIG. 3 is a flowchart of programmed instructions executed by a server of a travel-based geo-paired information system according to an embodiment.

FIGS. 1-3 show an embodiment of a travel-based geo-paired information system 10. FIG. 1 shows a diagram of a travel-based geo-paired information system 10. FIG. 2 depicts a travel-based geo-paired information system 10 used by a traveler in a vehicle, such as a car, a bus, a train or the like. FIG. 3 shows a flow chart of programming of a server of the system 10. In embodiments, a traveler includes a driver, a passenger or the like in any type of vehicle.

FIG. 1 depicts an embodiment of a travel-based geo-paired information system 10. The system 10 may include user computing devices 12 and a server 14, wherein each user computing device 12 is coupled to the computer server 14. This coupling may be a network connection, such as through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a cloud-based infrastructure architecture.

The server 14 may include a memory storing various data. The memory of the server 14 may store geo-paired information corresponding to particular points of interest geolocations, wherein location information for the points of interest geolocations is also stored and associated with the geo-paired information corresponding to the geolocations. This may be geo-paired information about the point of interest geolocation, such as historical geo-paired information relating to a point of interest geolocation, a historical account of an event occurring at a point of interest geolocation, information about the creation of a structure at a point of interest geolocation and the like. In other words, the geo-paired information may be about the geology, history or any other information regarding the point of interest of that segment of the route travelled. Further, in some embodiments, the geo-paired information for presentation on the user computing device 12 may be customized to certain lengths to pair with the route and the speed of travel by the user in order to correspond the information with the point of interest as the user is travelling past the point of interest.

The user computing device 12 may be coupled to the server 14, and, referring to FIGS. 2 and 3, the server 14 may be programmed to receive location information from the user computing device (Step 30); automatically process the location information and determine whether a location of the user computing device is within a predetermined distance from a point of interest geolocation (Step 31); automatically find and retrieve geo-paired information corresponding to the point of interest geolocation (Step 32); and automatically deliver to the user computing device for presenting the geo-paired information corresponding to the location of the user computing device (Step 33). In some embodiments, the user computing device 12 may be utilized by a traveler within a vehicle 20 (See FIG. 2). The user computing device 12 may be operating a mobile app as part of the system 10, wherein operation of the mobile app couples the user computing device 12 to the server 14. The user computing device 12 operating the mobile app, may further operated to determine its location and send the location data to the server through the established connection. This location data, for example, may be location data obtainable by a smartphone and then sent to the server 14.

As shown in FIG. 2, the user computing device 12 may be within vehicle 20 and the location may be sent to the server 14. The location may be within a predetermined distance 24 of the point of interest geolocation 22, thereby initiating the sending of geo-paired information corresponding to the geolocation 22 to the user computing device 12 within the vehicle 20.

Figure 4A:
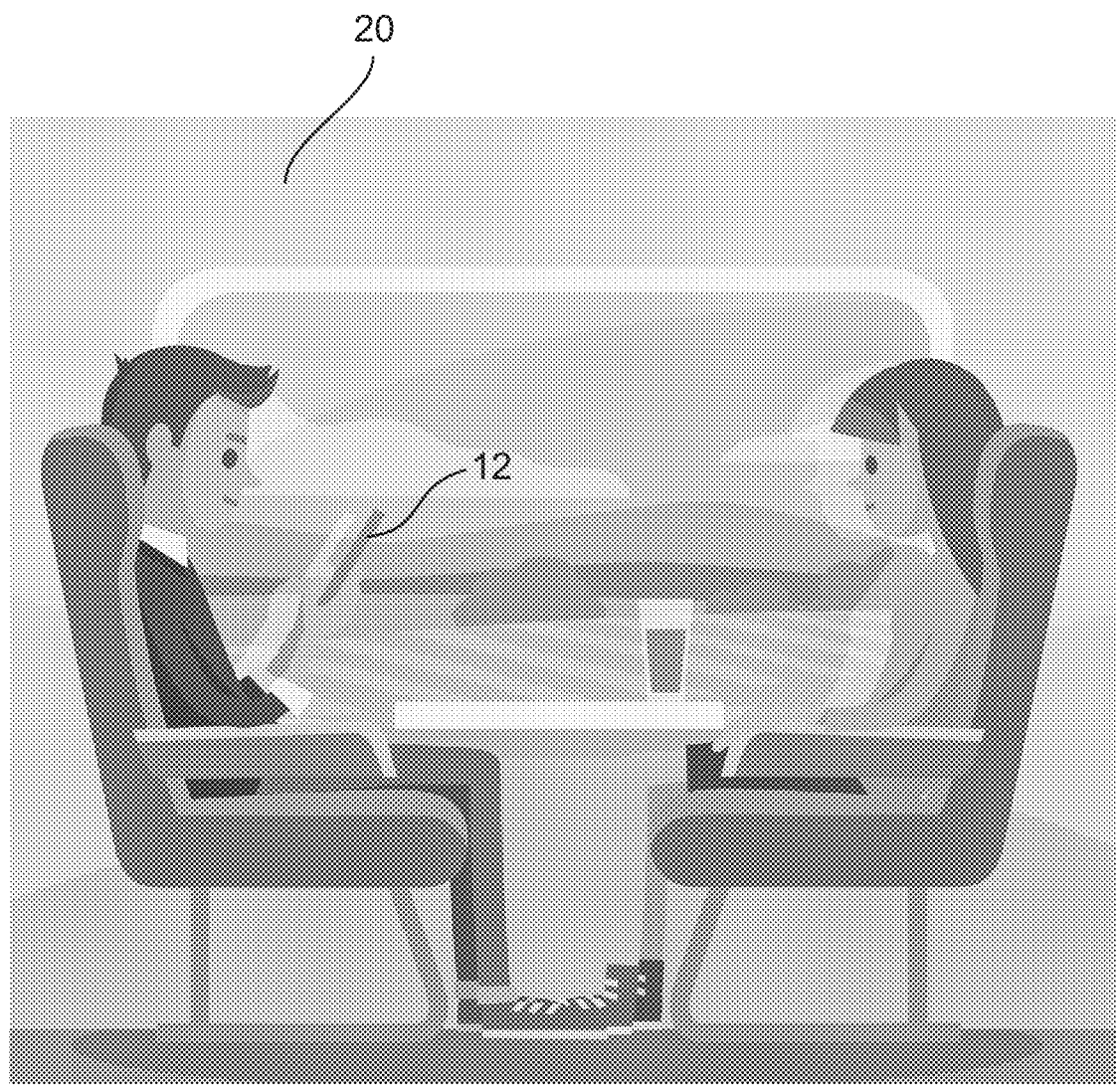
FIG. 4A depicts a travel-based geo-paired information system used in a vehicle according to an embodiment.
Figure 4B:
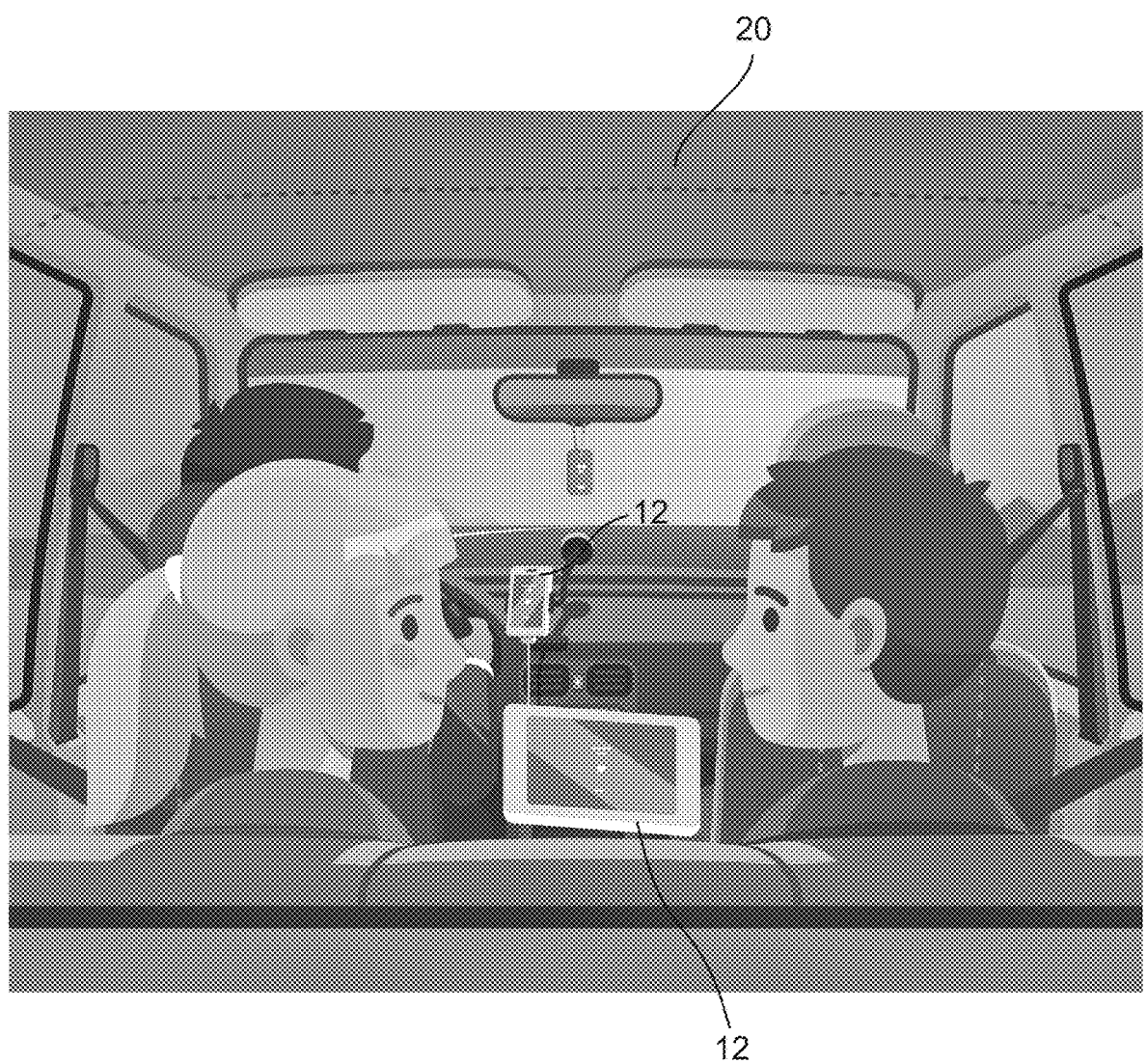
FIG. 4B depicts a travel-based geo-paired information system used in a bus or train according to an embodiment.

The vehicle 20 may include any type of vehicle, such as a car depicted in FIGS. 2 and 4B, a train and/or bus as depicted in FIG. 4A, a plane, a ship or any other type of vehicle that may not be depicted, wherein users can utilize for travel.

Once the geo-paired information is sent to the user computing device 12, the geo-paired information is automatically initiated to play. In some embodiments, there may be several points of interest that are available based on the location of the user computing device 12. In these instances, the server 14 may be programmed to send a list of geo-paired information to the user computing device for selection, the list including different points of interest, wherein the user may select a desired geo-paired information associated with a desired point of interest to present on the user computing device 12. Further still, the server 14 may also be programmed to send a list of geo-paired information to the user computing device for selection, the list including different content types of geo-paired information of a point of interest or multiple points of interest. The different content types of geo-paired information may include historical content, geology content, a kid version content, a teen version content, an adult version content and the like. In embodiments, the server may be programmed to supply lists for both multiple points of interest and different types of content associated with the multiple points of interest to the user computing device 12 for selection by the user.

Figure 5A:
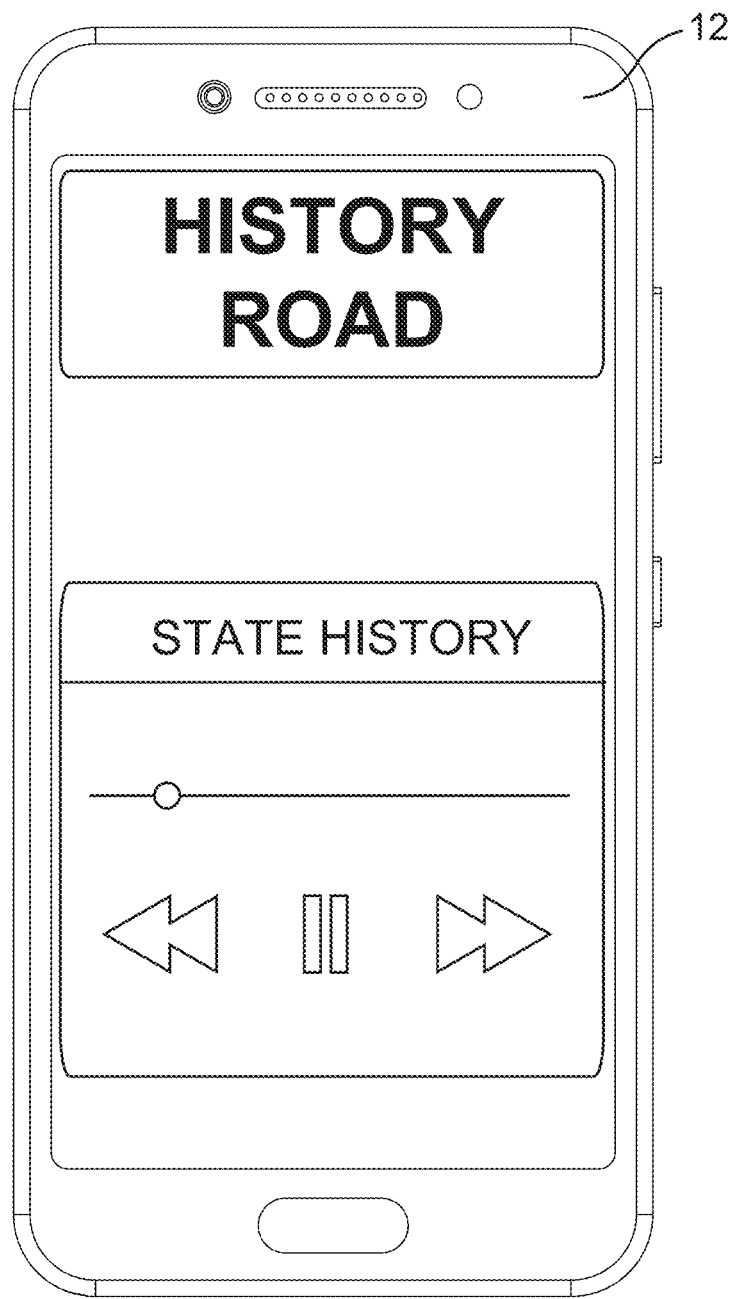
FIG. 5A depicts a user computing device of a travel-based geo-paired information system according to an embodiment.
Figure 5B:
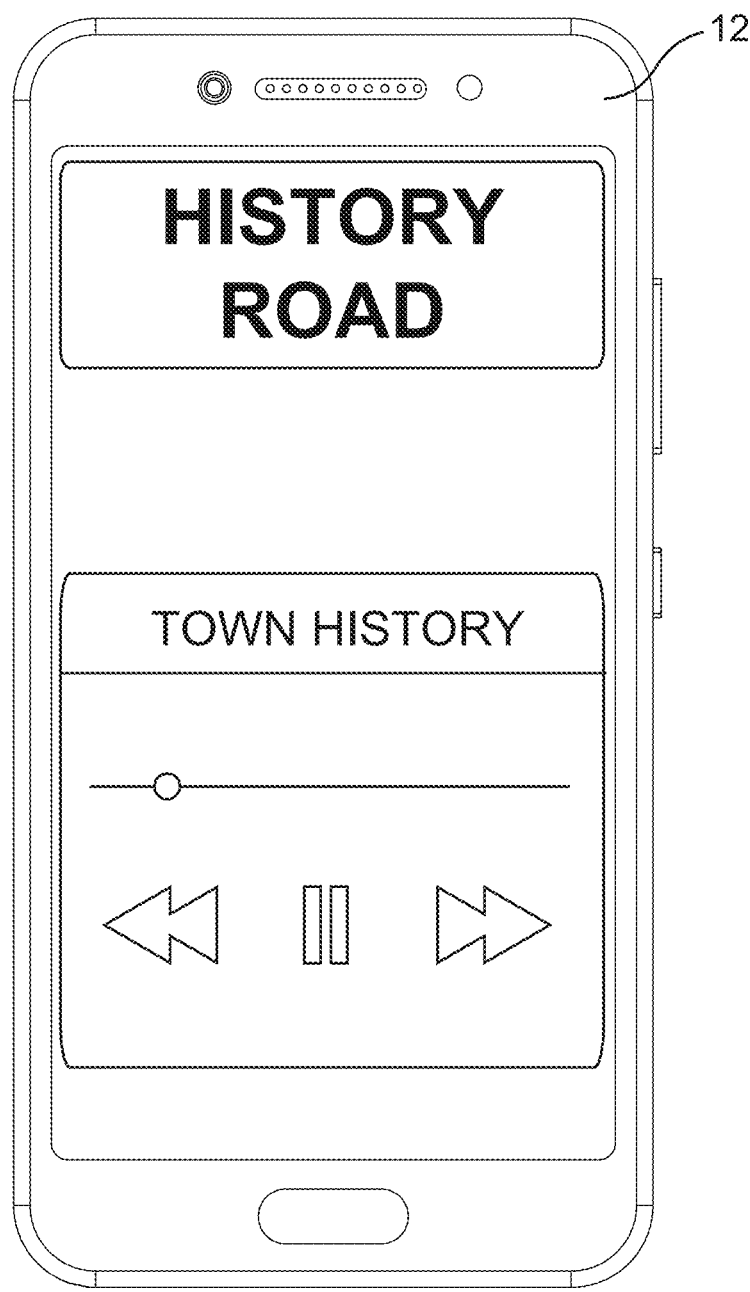
FIG. 5B depicts a user computing device of a travel-based geo-paired information system according to an embodiment.
Figure 5C:
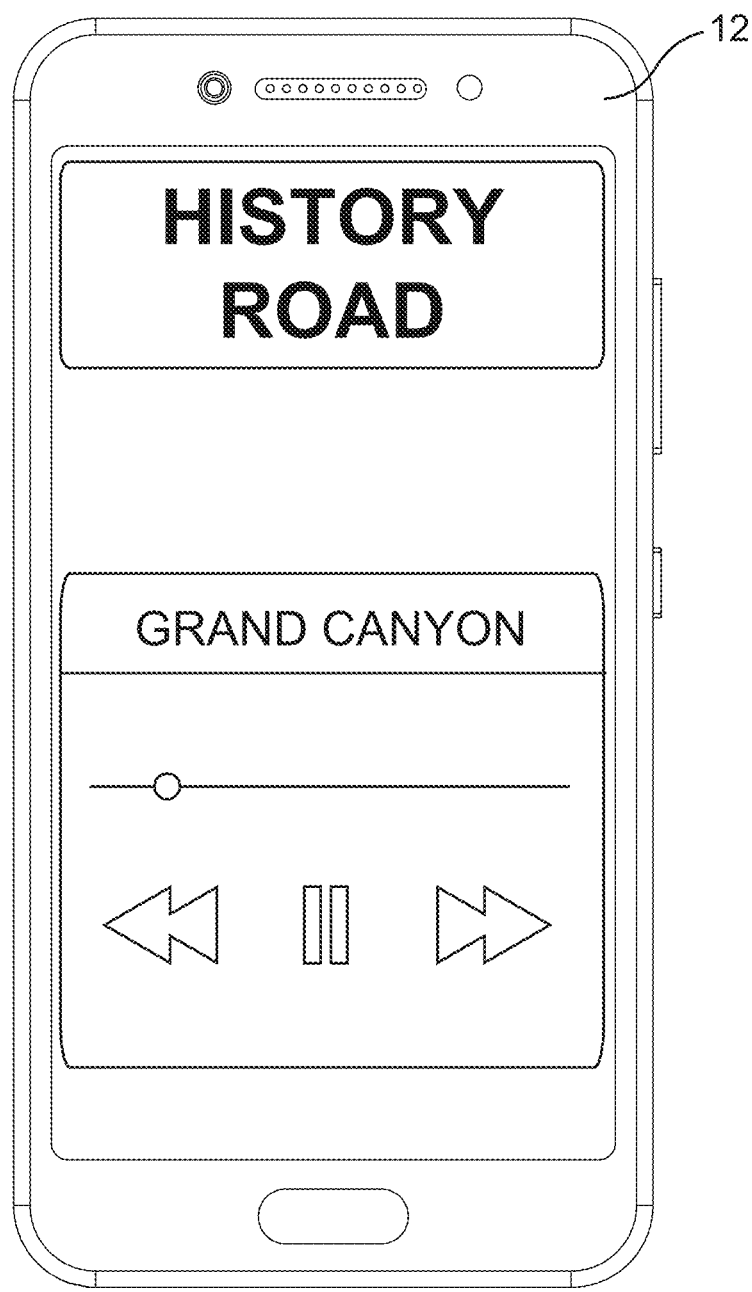
FIG. 5C depicts a user computing device of a travel-based geo-paired information system according to an embodiment.
Figure 5D:
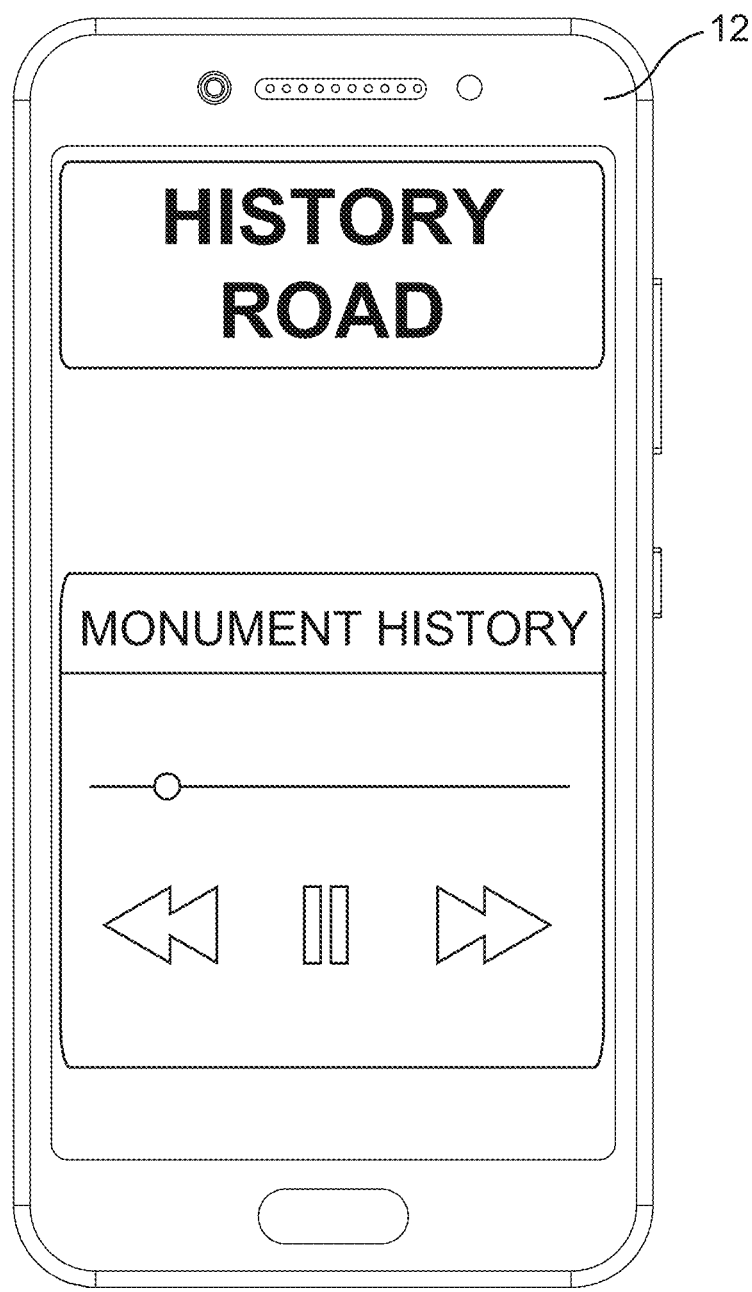
FIG. 5D depicts a user computing device of a travel-based geo-paired information system according to an embodiment.

It will be understood that the geo-paired information may correspond to the profile of the user, wherein the user may set certain likes and/or dislikes in order for the system to determine the type or types of content the user is interested in. For example, FIGS. 5A-5D depict various types of geo-paired information that may match user interest. FIG. 5A depicts a user computing device 12 presenting or playing a state history related geo-paired information, wherein the user may learn the history of a point of interest, such as a historical element from a state as the user crosses the state line, including state history, industrial history and the like. As shown in FIG. 5B, depicted is a user computing device 12 presenting or playing a town history related geo-paired information, wherein the user may learn the history of a point of interest, such as a historical element from a town as the user travels through or by a town. As shown in FIG. 5C, depicted is a user computing device 12 presenting or playing a natural feature history related geo-paired information, wherein the user may learn the history of a point of interest, such as a the Grand Canyon, the Mississippi River or other type of natural feature. As shown in FIG. 5D, depicted is a user computing device 12 presenting or playing a monument history related geo-paired information, wherein the user may learn the history of a point of interest, such as the Alamo, Gettysburg or other type of monument. It will be understood that all types of geo-paired information such as history, state history, town history, natural feature history, monument history and the like that may be associated with particular geo locations of particular points of interest.

The geo-paired information may be audio, audio/visual, text, text and graphics, video, and the like, that recounts information specific to a point of interest geolocation. It is contemplated that the driver may elect to receive the geo-paired information in a form that complies with state driving laws, while passengers may have the same or alternative feeds of information. The geo-paired information may include existing content and very likely includes original content that may be specifically created for this unique system to be paired with points of interest along specific travel segments. A point of interest may include natural or manmade features or even mile markers wherein the geolocations are determined and stored in memory of the system 10 and available for processing to determine if the location of the user computing device 12 is within a predetermined distance from the point of interest geolocations. In embodiments, the geo-paired information may be streamed from the server 14 to the user computing device 12.

Figure 6:
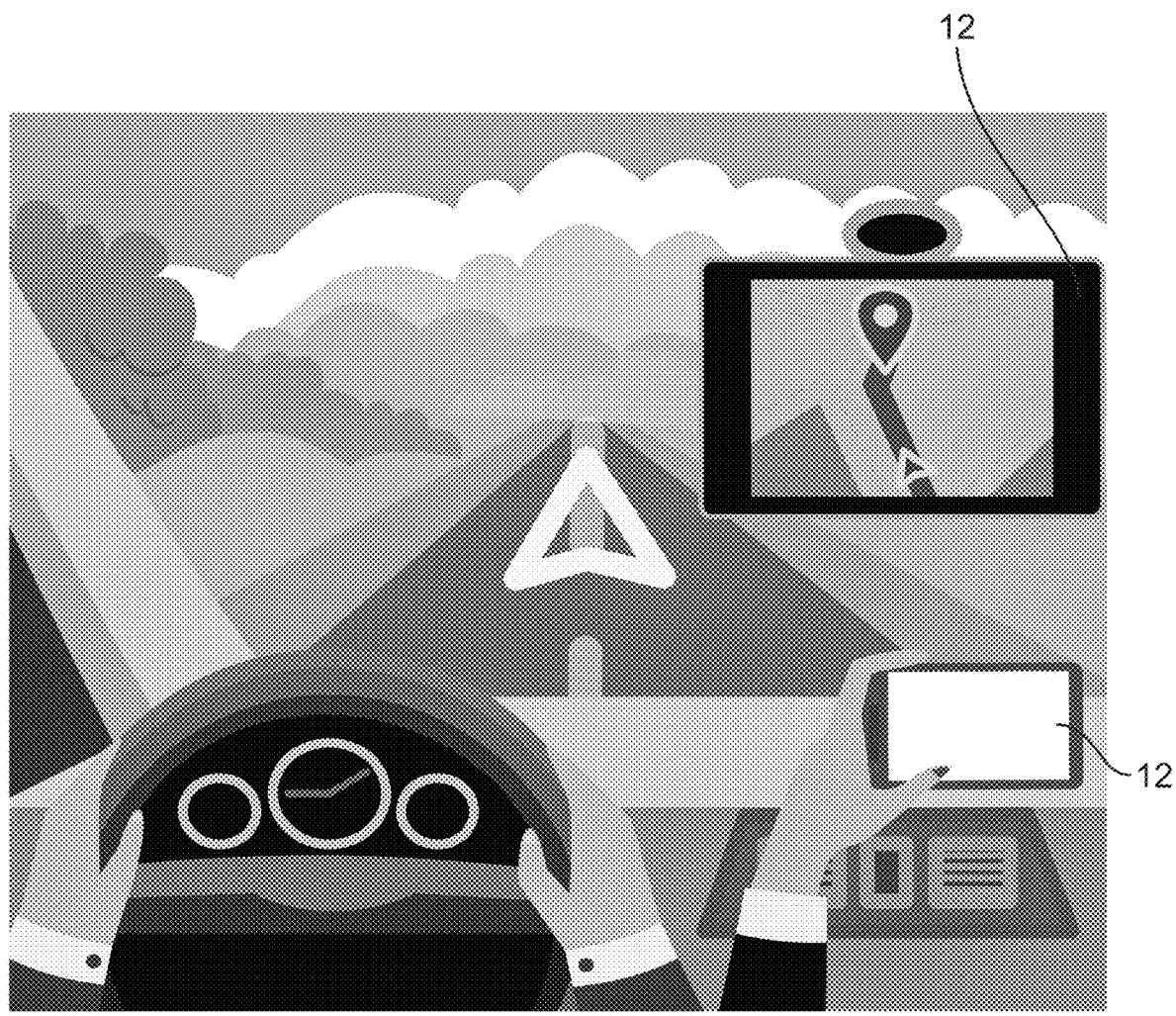
FIG. 6 depicts a user computing device of another embodiment of a travel-based geo-paired information system wherein the system downloads content to a user computing device according to an embodiment.

In other embodiments, as depicted in FIG. 6, the geo-paired information may be downloadable from the server 14 to the user computing device 12. In these embodiments, the traveler may utilize a mobile app on the user computing device 12 to plan a travel route. The planned travel route may be sent to the server 14. The system 10 may then download all geo-paired information associated with the travel route. During travel, as the user computing device 12 is within a predetermined distance from a point of interest geolocation, the mobile app may automatically initiate playing of geo-paired information on the user computing device, wherein the geo-paired information corresponds to the geolocation. Embodiments where the system allows for download of geo-paired information, the user may manually select to play certain content.

Figure 7:
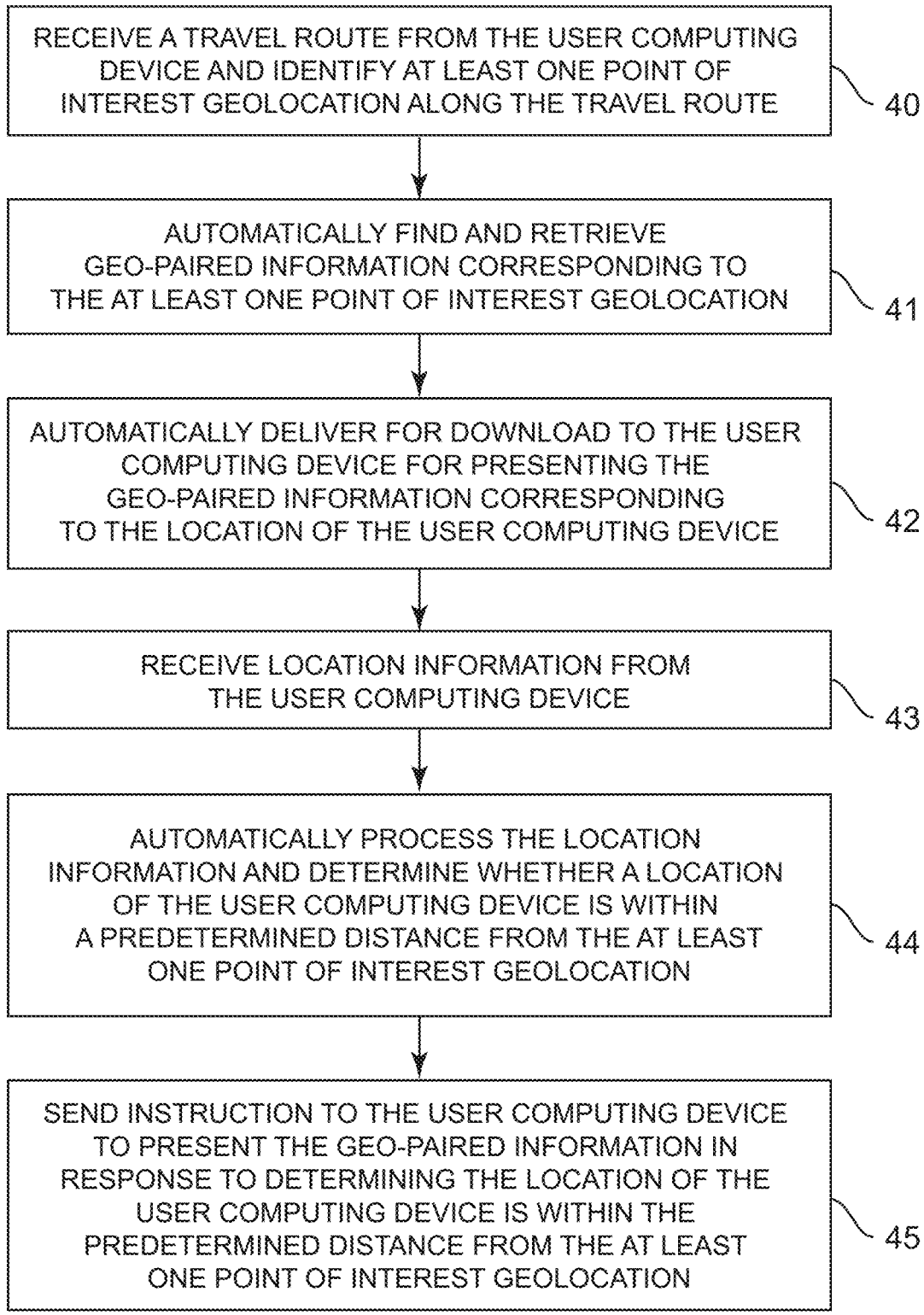
FIG. 7 is a flowchart of programmed instructions executed by a server of a travel-based geo-paired information system as shown in FIG. 6 according to an embodiment.

In these embodiments as depicted in FIG. 6, and with additional reference to FIG. 7, the system 10 may include the server 14 programmed to receive a travel route from the user computing device and identify at least one point of interest geolocation along the travel route (Step 40); automatically find and retrieve geo-paired information corresponding to the at least one point of interest geolocation (Step 41); automatically deliver for download to the user computing device for presenting the geo-paired information corresponding to the at least one point of interest geolocation (Step 42); receive location information from the user computing device (Step 43); automatically process the location information and determine whether a location of the user computing device is within a predetermined distance from a point of interest geolocation (Step 44); and send instruction to the user computing device to present the geo-paired information in response to determining the location of the user computing device is within the predetermined distance from the at least one point of interest geolocation (Step 45).

By way of example only, and not as a limitation, the system 10 may include an original creation of geo-paired information, such as, by a leading historian of a state like the State of Colorado and the information may be regarding the city of Aspen, the content created by the leading historian would be saved in the server 14 as geo-paired information because it is paired with the geolocation of Aspen, Colorado. When a user of the system is within a predetermined distance of Aspen, Colorado, the system may automatically deliver the originally created geo-paired information for the history, the geology, or other types of content, to the user computing device 12 for presenting the geo-paired information to the user according to the user's preference.

Embodiments may be available on or through the internet, such as through domain names reserved and owned by Applicant that include milemarkUSA.com (or respective state abbreviation in place of the "USA" text in the domain name), historyrd.com, history-road.com, historyroute.com, roadtick.com, historyplanner.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A method of using a computer-controlled travel-based geo-paired information system comprising:
   sending location information from a user computing device to a server, the location information including a location of the user computing device travelling within a vehicle;
   automatically determining, by the server, whether the location of the user computing device within the vehicle is within a predetermined distance from a point of interest geolocation;
   automatically retrieving, by the server from memory of the server, geo-paired information corresponding to the point of interest geolocation and corresponding to a profile of a user of the user computing device in response to determining the user computing device is within the predetermined distance from the point of interest geolocation; and
   automatically streaming the geo-paired media from the server to the user computing device through a network connection as the user computing device is travelling within the vehicle and in proximity to the point of interest.

2. The method of claim 1, further comprising customizing the geo-paired media to correspond to previously entered user likes and dislikes in order to correspond the geo-paired media playing on the user computing device with the point of interest and the user likes and dislikes.

3. The method of claim 1, wherein the geo-paired media further comprises audio or video.

4. The method of claim 1, wherein multiple types of geo-paired media is associated with a point of interest geolocation.

5. The method of claim 4, further comprising determining the type of geo-paired media corresponding to the previously entered user likes and dislikes to automatically deliver to the user computing device, for streaming, the determined type of geo-paired media.

* * * * *